United States Patent [19]

Hunt

[11] 3,960,051

[45] June 1, 1976

[54] EJECTION LAUNCH MECHANISM

[75] Inventor: William E. Hunt, North Andover, Mass.

[73] Assignee: The United States of America as represented by the Secretary of the Navy, Washington, D.C.

[22] Filed: Oct. 7, 1974

[21] Appl. No.: 512,377

[52] U.S. Cl. ............................ 89/1.8; 89/1.5 R; 89/1.812
[51] Int. Cl.² ...................... F41F 3/06; F41F 5/02
[58] Field of Search ............ 89/1.806, 1.807, 1.811, 89/1.812, 1.813, 1.814, 1.5 R, 1.5 D, 1.8

[56] References Cited
UNITED STATES PATENTS

| | | | |
|---|---|---|---|
| 2,774,282 | 12/1956 | Ballash et al. | 89/1.814 X |
| 3,057,652 | 10/1962 | Geffner et al. | 89/1.5 R X |
| 3,186,301 | 6/1965 | Buschers | 89/1.5 R X |
| 3,524,381 | 8/1970 | Miller | 89/1.5 R |
| 3,722,944 | 3/1973 | Dand | 89/1.5 R X |
| 3,771,412 | 11/1973 | Lebovitz | 89/1.807 |

Primary Examiner—David H. Brown
Attorney, Agent, or Firm—Richard S. Sciascia; Harvey A. David; Don D. Doty

[57] ABSTRACT

A breech and latch mechanism is described herein for use in an aircraft missile ejection launching system. The described mechanism is characterized by a fluid actuated piston that rotates a bell crank and link from a hook locking over-center position to a hook retracting position. The piston acts also as a sequencing valve to pass fluid to pressure actuated ejection rams. A pressure fluid distributing orifice structure and a pyrotechnic cartridge igniting firing pin structure are described also.

12 Claims, 4 Drawing Figures

EJECTION LAUNCH MECHANISM

STATEMENT OF GOVERNMENT INTEREST

The invention described herein may be manufactured and used by or for the Government of the United States of America for governmental purposes without the payment of any royalties therein or therefor.

FIELD OF THE INVENTION

This invention relates to aircraft missile ejection launching mechanisms, and more particularly to improvements therein with regard to latching of the missile for retainment during flight, unlatching prior to ejection, and development of ejection forces.

Rocket type aircraft borne missiles of the larger sizes are characteristically attached to the undersides of the aircraft wings or fuselage by releasable attachment devices. In order to assure separation of a missile precisely at the ejection velocity required to overcome the various aerodynamic forces acting thereon during ejection from the launching aircraft and before ignition of the rocket, ejection means are generally provided in the form of expansible cylinders or rams that are powered, for example, by high pressure gas. Such gas is derived either from pyrotechnic charges or compressed gas flasks. Obviously, for safety purposes it is desirable that the attachment means be absolutely secure after the missile is attached with the aircraft oon the ground, be capable of maintaining a ready but secure condition during flight, and yet be substantially instantly releasable upon demand when a missile is to be launched. Moreover, it is highly desirable that the attachment and ejection apparatus be light in weight, easily operated into a missile latched condition, reliable in its securing and releasing functions, and sufficiently durable to withstand many repeated cycles of use.

DISCUSSION OF THE PRIOR ART

One example of a typical missile attachment and ejection apparatus is described in U.S. Pat. No. 3,771,412 to Bernard Lebovitz. That apparatus utilizes attachment means wherein pivotal hooks are actuated by rods connected to a bell crank. The bell crank is rotated by a two-bar toggle linkage that is driven from an over-center locked position by a gas actuated piston. A solenoid latch is used to prevent rotation of the bell crank until such time as it is energized in preparation of a launch event. A removable safety pin is positioned through the two bar toggle linkage to prevent actuation when the aircraft is on the ground.

The use of solenoid latches, and a multiplicity of toggle links associated with a pivotal bell crank leads to undue complexity, system weight, and likelihood of malfunction.

SUMMARY OF THE INVENTION

The present invention aims to overcome some or all of the disadvantages and shortcomings of the prior art through the provision of a missile launching mechanism that incorporates novel and advantageous attachment means wherein a gas operated piston is coupled to a bell crank which itself forms part of an over-center toggle connection to a hook operating lever, thereby eliminating some elements and the attendant problems of excess weight, lost motion, and the like. The bell crank is further provided with camming surfaces that cooperate with a cantilever spring detent so as to eliminate the need for a solenoid latch, further reducing weight and improving reliability.

The invention further includes a novel gas distribution controlling orifice structure that affords improved servicing, inspection and repair capability to the launching mechanism. Also, the mechanism makes use of the actuating piston as a gas control valve to assure proper sequencing of unlocking, releasing, and ejection functions of the mechanism.

With the foregoing in mind, it is a principal object of the invention to provide an improved aircraft missile ejection launch mechanism.

Another object is to provide such a mechanism which is characterized by lighter weight, increased reliability, as well as greater ease of maintenance and operation.

Still another object is to provide an ejection launch mechanism of the foregoing character wherein attachment of a missile can be accomplished by simple rotation of a wrench through a partial turn, and wherein other elements requiring service, e.g., gas distribution means and gas generating cartridge breech means, can all be manipulated by the same wrench.

Yet another object is the inclusion of improved gas generating cartridge electrical ignition contact means, and an improved cartridge to breech sealing configuration.

Other objects and many of the attendant advantages will be readily appreciated as the subject invention becomes better understood by reference to the folllowing detailed description, when considered in conjunction with the accompanying drawings.

DESCRIPTION OF THE PREFERRED EMBODIMENT

Figures 1, 3:
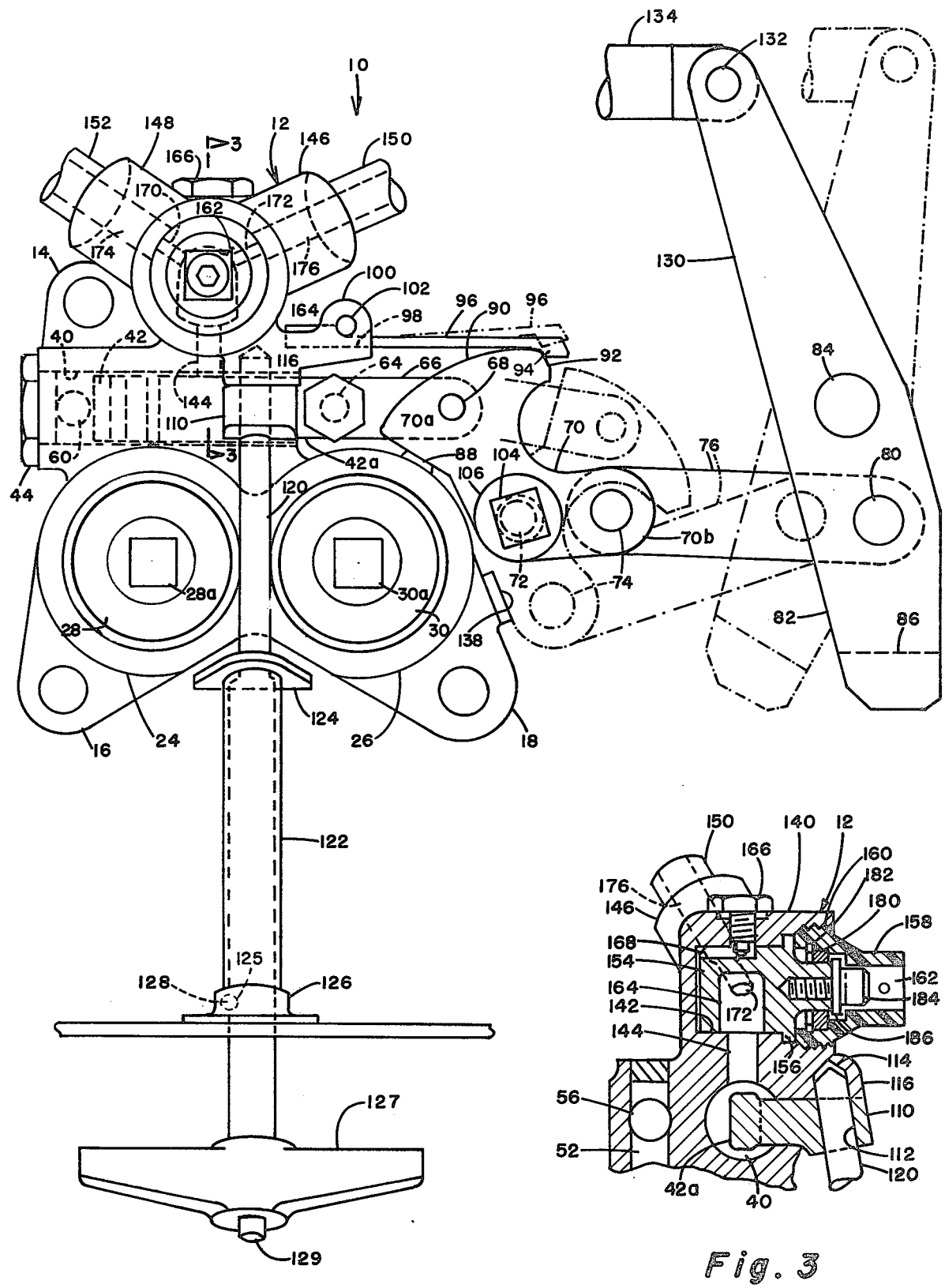
FIG. 1 is a front elevational view of an ejection launching breech and latch mechanism embodying the invention.
FIG. 3 is a fragmentary sectional view taken substantially along line 3—3 of FIG. 1.
Figure 2:
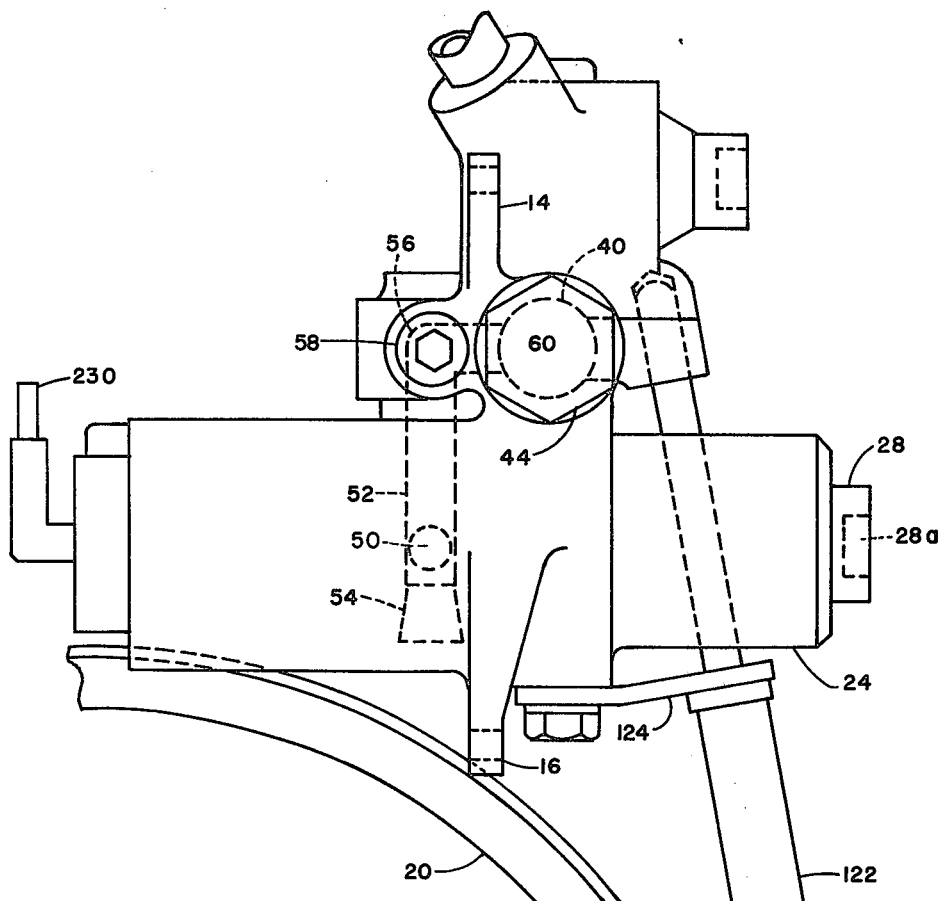
FIG. 2 is a side elevational view of the mechanism of FIG. 1.

Referring to FIGS. 1 and 2, an aircraft missile ejection launch breech and latch mechanism 10 embodying the invention comprises a body member 12, conveniently in the form of a machined casting, which is provided with apertured mounting ears 14, 16 and 18 by which the body member is adapted to be bolted or otherwise secured in fixed relation to a strongback (not shown) carrying missile cradling members such as shown fragmentarily at 20. Body member 12 is provided with a pair of cylindrical breech portions 24, 26 which are bored to receive gas generating pyrotechnic cartridges, the ignition and disposition of gases of which will be described later. Suffice it to say for now that the breech portions are closed and sealed by removable screw plugs 28, 30 having sockets 28a, 30a for reception of a square drive wrench. The sealing plugs are thereby readily removable for insertion of fresh cartridges and removal of spent ones.

Body member 12 is also provided with a cylindrical bore 40 extending parallel to the axis of a missile and transverse to the mentioned cylindrical portions 24, 26. A piston 42 is reciprocably carried in bore 40, which bore is closed at one end by a screw plug 44. Piston 42 is adapted to be driven in bore 40, in a direction away from plug 44, by gas developed under pressure by the pyrotechnic charges in the breech portions 24, 26 in order to operate missile latch means, about to be described. Gas for this purpose is conveyed from the interiors of breech portions 24, 26 via a transverse passage 50 to a centrally located, vertical gas passage 52 formed in body 12 and sealed by a plug 54. Vertical passage 52 communicates with bore 40 via a horizontal passage 56, terminated by a plug 58, and a horizontal passage 60 opening into bore 40 adjacent plug 44.

Piston 42 includes a rod portion 42a which is pivotally connected at 64 to one end of a link 66, the other end of which is pivotally connected at 68 to one leg 70a of a bell crank lever 70. Lever 70, which is mounted for pivotal movement about a pin 72, has its other leg 70b pivotally connected at 74 to one end of a link 76. The other end of link 76 is pivotally connected at 80 to a missile latch or hook lever 82. Lever 82 is pivoted at 84 to suitable support means, e.g., the mentioned strongback, and is provided with a missile element engaging hook or load bearing surface 86 adjacent its lower end adapted, when lever 82 is in its full line position, to resist the downward forces resulting from the mass of a supported missile.

It will be noted that when the parts 66, 70, 76 and 82 are in their illustrated full line positions, the pivot 74, between bell crank lever 70 and link 76, is slightly over-center with respect to pivots 72 and 80. Rotation of bell crank lever 70 in a counterclockwise direction, as viewed in FIG. 1, is limited engagement with a pad 88 on breech porton 26. Leg 70a of bell crank lever 70 is provided with an arcuate cam surface 90 terminating at a ramp surface 92 that is in restrained engagement with a complementary surface 94 formed at the end of a cantilevered leaf spring 96. Spring 96 extends from a ledge 98 on body member 12, and lies between a pair of apertured ears 100 through which a retainer pin 102 extends. Pin 102 serves to retain spring 96 which has a thicker or head portion engaging that pin, and also serves as a fulcrum against which spring 96 may be flexed to its dot and dash line position upon rotation of bell crank lever 70. Spring 96 serves as a detent, cooperating with bell crank lever 70, to detain the above mentioned overcenter condition of pivot 74, whereby hook lever 82 is rigidly held in its missile retaining position until bell crank lever 70 is forcibly rotated by movement of piston 42.

Rotation of bell crank lever 70 into its retained, full line position is effected during loading operations to bring hook surfaces 86 into engagement with a missile temporarily supported by other means. This rotation of lever 70 is conveniently accomplished by means of the same square derive wrench mentioned earlier, engaged in a socket 104 formed in hub 106 of the bell crank lever.

In addition to detent spring 96, a removable locking, or ground safety, pin is provided to retain the piston 42 and various levers described above in a missile holding condition. Thus, piston 42 is provided with a lug 110, best shown in FIG. 3, extending outwardly through a slot in housing 12. Lug 110 has an aperture 112 which is in registry with a recess 114 in a boss 116 extending from body 12 when the parts are in their full line positions. A ground safety pin 120 extends through aperture 112 into recess 114 to prevent movement of piston 42. Ground safety pin 120 includes a thickened portion received in a guide tube 122 supported by brackets 124, 126, and is provided with a T-handle 127 for convenience in insertion and withdrawal. Pin 120 is further provided with a detent mechanism wherein a ball 128 is normally prevented from being forced inwardly until a push botton 129 is depressed. Pins of this type are well known to those skilled in the art to which the invention pertains and may be obtained from commercial sources such as The Hartwell Corporation of Azusa, California, which sells them under the trademark "LOCKWELL," or Avbank Mfg. Co., Inc. of Burbank, California. Ball 128 engages a recess 125 in bracket 126 to prevent removal of pin 122 until button 129 is pressed. When the aircraft carrying the mechanism 10 is about to begin a flight, the ground crew releases pin 122, by pressing button 129 thereof, and withdraws the pin from the mechanism.

Leg 70b and link 76 are proportioned with the former considerably shorter than the latter so that clockwise movement, starting from a position of near alignment, will produce a variable speed ratio of movement of lever 82. The initial effects of clockwise rotation of bell crank lever 70 are the displacement of detent spring 96 and movement of pivot pin 74 to the other side of a center position. This unlocks the hook lever 82 with a minimum of movement thereof. Continued rotation of bell crank lever 70 and pivot pin 74 to their dot and dash line positions results in displacement of load bearing hook surface 86 at an increasing speed from the missile element, thereby releasing the associated portion of the missile.

Lever 82 conveniently extends upwardly from pivot pin 84, as shown at 130, and is pivoted at 132 to one end of a hook lever operating rod 134. Rod 134 extends to the upper end of a duplicate (not shown) of hook lever 82, which duplicate hook lever is operable in tandem with that illustrated, for retaining and releasing the same missile. Thus, hook lever 82 and its duplicate may be associated respectively with the after and forward portions of a missile.

Rotation of bell crank lever 70 in the clockwise direction is limited by engagement thereof with a stop pad 138. This also limits the excursion of piston 42 to a position which will divert gas, entering cylinder bore 40 from the breech portions, through distributing means presently to be described to a plurality of missile ejecting rams which can be of the type and disposition described in the mentioned U.S. Pat. No. 3,771,412.

Referring now to FIG. 3, the upper portion of body 12 is provided with a generally cylindrical portion 140 having a cylindrical bore 142. Bore 142 is placed in communication with bore 40 by a vertical passage 144. A pair of angularly divergent bosses 146 and 148 extend from portion 140 and serve as connections for pipes 150 and 152, respectively, leading to the aforementioned ejection rams. Disposed in bore 142 is an orifice element 154. Element 154 is generally cylindrical but has a flange 156 received in a counter bore of bore 142 and held therein by a plug member 158 threaded into the outer portion of bore 142 as shown at 160. Plug member 158 is provided with a square socket 162, conveniently of the same size as sockets 28a, 30a, and 104. Orifice element 154 is provided with a recess 164 which is in registration with passage 144. A screw 166 has a projection engaging a groove or keyway 168, and serves to maintain recess 164 in the proper orientation. With recess 164 so oriented, a pair of gas flow regulating orifices 170 and 172 are held in registration with passages 174 and 176, respectively, in boses 148 and 146 leading to pipes 152 and 150.

Plug 158 is rotatable relative to orifice element 154, the latter being loosely captivated with respect to the plug for easy removal from bore 142. Thus, a neck portion of element 154 extends through a washer 180, held in plug 158 by a retainer ring 182, and a socket headed screw 184 and washer 186 prevent withdrawal of that neck portion from washer 180. The just described construction permits easy removal and replacement of the orifice element for inspection, cleaning, or change or orifice size to meet different missile ejection force requirements. When the orifice element is being replaced, screw 166 cooperates with keyway 168 to prevent rotation of the orifice element while plug 158 is being tightened.

Figure 4:
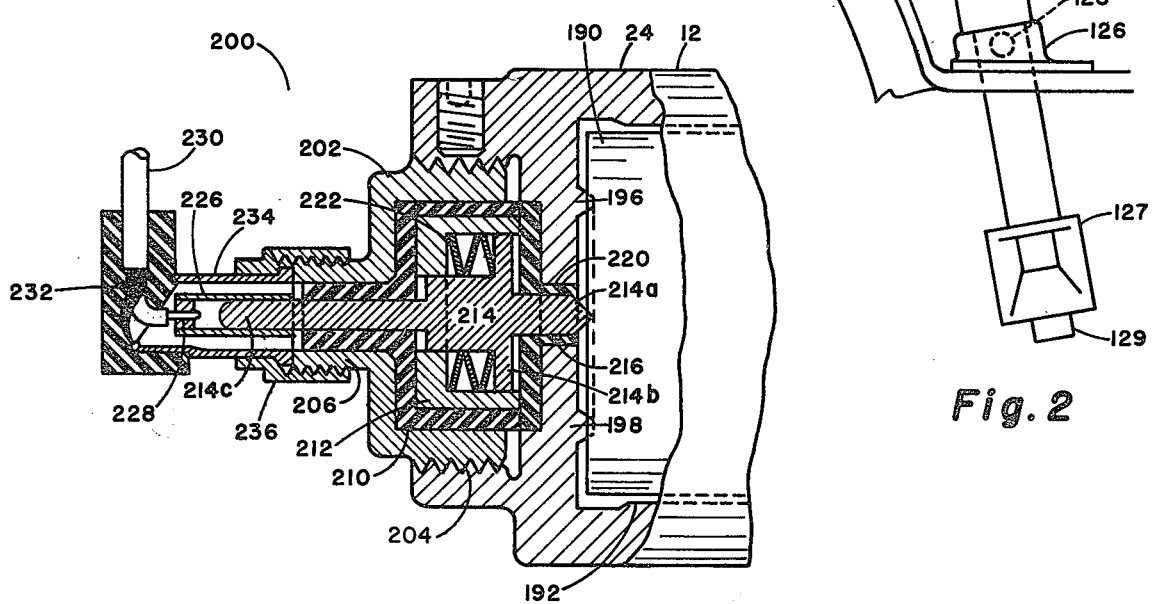
FIG. 4 is fragmentary sectional view, on an enlarged scale, of a portion of the mechanism.

Referring finally now to FIG. 4., an electrically ignitable pyrotechnic cartridge 190 is received in bore 192 of cylindrical portion 24 of body 12. Cartridge 190 comprises a can, preferably of a soft metal such as aluminum, the bottom wall of which is pressed against an annular ridge 196 machined to extend from an end wall 198 of portion 24, with sufficient force that the ridge forms an effective seal that prevents hot gasses in bore 192 from damaging insulating and firing pin elements of an electrical firing pin assembly 200 about to be described.

Firing pin assembly 200 comprises a generally cup-shaped metal body 202 which is threadedly engaged, as shown at 204, in a recess in cylindrical portion 24 adjacent wall 198. Cup-shaped body 202 has a threaded nipple 206 extending axially therefrom and is provided with an internal liner 210 of electrically insulating material. An annular, spring holding metal cup 212 is nested inside the cupshaped portion of insulating liner 210. A metal firing pin 214 has a cylindrical body poriton from which a cartridge engaging portion 214a extends through an insulating sleeve 216 in an opening 220 in wall 198. Firing pin 214 also comprises a radially extending flange 214b, slidably received in spring cup 212, which is acted upon by a plurality of Belleville spring washers 222 urging pin 214 toward cartridge 190. An electrical connection stem portion 214c of firing pin 214 extends through the insulating liner 210 and nipple 206 for engagement by an electrical connector sleeve 226 connected to a wire conductor 228 of a cable 230. Cable 230 comprises a shield element 232 connected to a sleeve 234, concentrically spaced about sleeve 226 and secured to nipple 206 by a nut 236.

When firing pin assembly 200 is screwed tightly into the recess in portion 24, and a cartridge 190 is seated in bore 192, pin 214 is depressed against the action of springs 222 which cause the cartridge engaging portion 214a of the firing pin to maintain good electrical contact with the base of the cartridge. Of course, a suitable electrical signal can be applied via cable 230 and firing pin 214 to ignite cartridge 192 which is of conventional construction.

In some ejection launch systems it is preferable to utilize tanks of compressed air or other gas as the source of high pressure fluid for operation of the latch and ejection ram means. The present invention therefore contemplates that such a source of high pressure gas may be utilized in place of the gas generating cartridges. The tanks may be independent, or may be formed integrally with body 12. In either event the described piston actuated latch mechanism and gas distributing orifice structure would remain unchanged.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A mechanism for use in an aircraft missile holding and ejecting system of the type comprising missile ejecting rams means operable by high pressure fluid, said mechanism comprising:
   a body adapted to be fixed to missile support structure, said body defining a cylinder bore;
   a piston reciprocable in said bore between first and second positions;
   a bell crank lever having first and second legs and mounted for rotation with respect to said body about a first pivot, said first leg being connected to said piston so that movement of said piston effects said rotation of said bell crank lever;
   a latch hook lever mounted for rotation with respect to said support structure about a second pivot spaced from said first pivot, said latch hook lever having a hook portion extending below said second pivot and presenting a load bearing surface;
   a rigid link connected at one end by a third pivot to said second leg of said bell crank lever and connected at the other end by a fourth pivot to said hook portion of said hatch hook lever;
   passage means, defined in said body, for conducting high pressure fluid into said bore to move said piston from said first to said second position, whereby said bell crank lever is rotated in a first direction to cause said link to pull said hook portion of said latch hook lever toward said body and out of engagement with a load on said load bearing surface.

2. A mechanism as defined in claim 1, and wherein:
   said bell crank lever comprises a hub portion adapted to be engaged by a wrench for rotation of said bell crank lever in a second direction, whereby said piston is returned from said second position to said first position, and said hook portion of said latch hook lever is moved away from said body into a missile holding position.

3. A mechanism as defined in claim 2, and wherein:
   said movement of said bell crank lever in said second direction is limited by stop means on said body when said third pivot is in an over-center position with said second leg and said link substantially aligned, whereby movement of said hook portion toward said body is prevented.

4. A mechanism as defined in claim 3, and wherein:
   said first leg of said bell crank lever presents an arcuate cam surface ending at a ramp surface;
   said mechanism further comprising a cantilever detent spring extending from said body and having a ramp engaging hook thereon adapted to yieldably restrain said bell crank lever against movement away from said stop means.

5. A mechanism as defined in claim 4, and further comprising:
   a chamber defined in said body;
   second passage means, defined in said body, communicating between said bore and said chamber;

conduit means for connecting said chamber with said missile ejecting ram means;

said second passage means being obturated by said piston when in said first position and open to said bore when said piston is in said second position, whereby said high pressure fluid is prevented from passing to said ram means until after said piston has moved from said first position substantially to said second position, and said hook portion of said latch hook lever has been moved out of engagement with said load.

6. A mechanism as defined in claim 5, and further comprising:

a lug extending laterally, from said piston, to the exterior of said body, said lug having an aperture therein;

a boss extending laterally from said body and having a recess therein;

said aperture in said lug being in registration with said recess in said boss when said piston is in said first position; and pin means, removably extending through said aperture into said recess for preventing movement of said piston, said bellcrank lever, and said latch hook lever.

7. A mechanism as defined in claim 6, and further comprising:

high pressure fluid flow restricting orifice means disposed in said chamber.

8. A mechanism as defined in claim 7, and wherein said orifice means comprises:

an orifice member seated in said chamber and having a recess in registration with said second passage;

a plurality of orifices defined in said orifice member from said recess thereof to the exterior thereof and disposed in registration with passages connecting with said conduit means; and keying means, cooperating between said body and said orifice member for retaining thereof in a position with said recess thereof and said orifices in registration with their respective passages.

9. A mechanism as defined in claim 8, and further comprising:

plug means, threadedly engaged in said body, for closing said chamber and retaining said orifice member;

said orifice member being loosely coupled to said plug means wherein said orifice member may be withdrawn from said chamber with removal of said plug means from said body.

10. A mechanism as defined in claim 9, and further comprising:

a source of said high pressure fluid; and means for activating said source to supply said fluid to said first passage means.

11. A mechanism as defined in claim 10, and wherein:

said body comprises a pyrotechnic cartridge receiving chamber;

said source comprises a pyrotechnic cartridge disposed in said cartridge receiving chamber; and said activating means comprises an electrical firing pin assembly mounted on said body and comprising an electrical firing pin adapted to be held in engagement with said cartridge.

12. A mechanism as defined in claim 11, and wherein said firing pin assembly comprises:

a cup-shaped metal member having a tubular nipple extending axially therefrom;

a liner of electrically insulating material within said cup-shaped metal member and nipple;

an annular spring cup disposed within said liner;

a firing pin including a cylindrical portion from which a flange extends radially, a cartridge engaging portion extends axially in one direction, and an electrical connector engaging stem portion extends in the other direction through said liner and tubular nipple; and spring means, disposed between said spring cup and said flange, for yieldably and resiliently urging said firing pin toward said cartridge.

* * * * *